Figure 3:
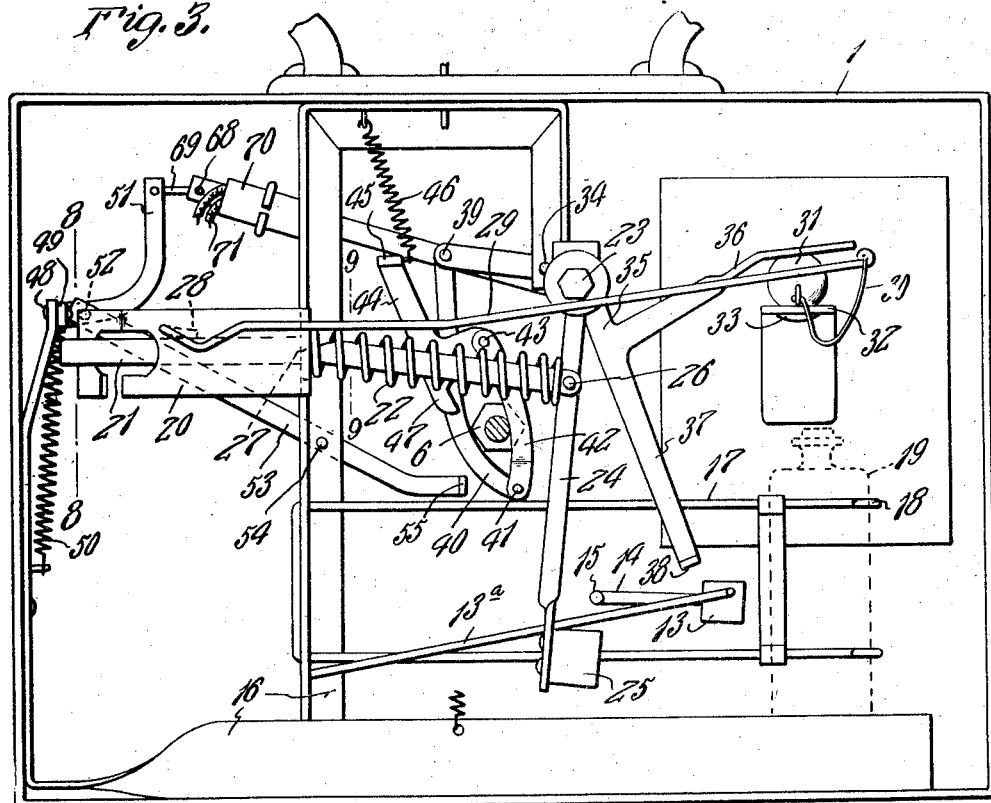

Sept. 15, 1925.  J. B. LOCKER  1,554,107
BURGLARPROOF DEVICE
Filed Dec. 6, 1924  5 Sheets-Sheet 1
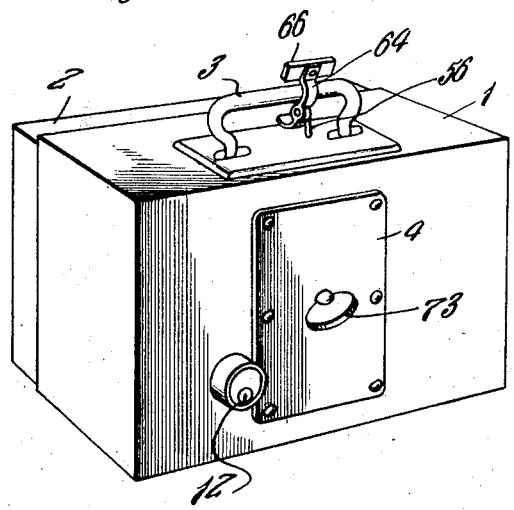
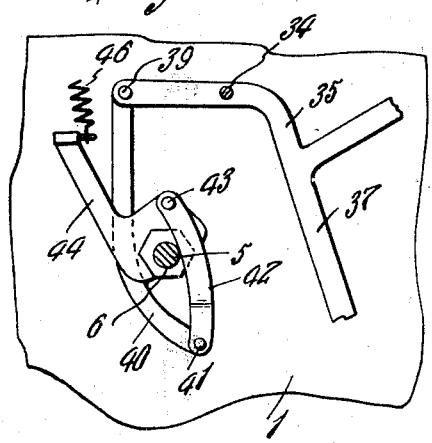
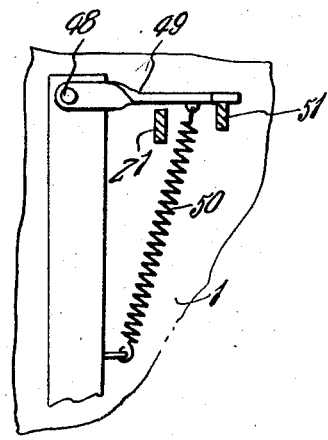
J. B. Locker
INVENTOR
BY Victor J. Evans
ATTORNEY

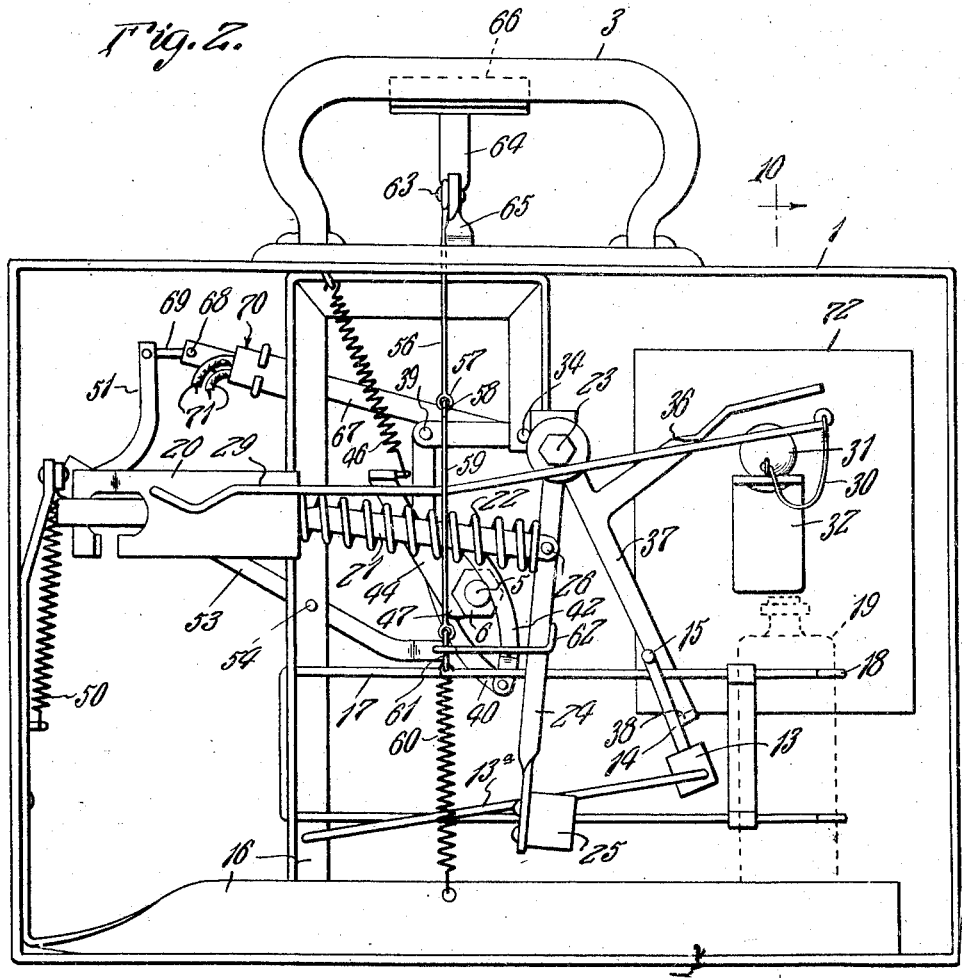

Sept. 15, 1925.  1,554,107
J. B. LOCKER
BURGLARPROOF DEVICE
Filed Dec. 6, 1924      5 Sheets-Sheet 3

J. B. Locker
INVENTOR
BY Victor J. Evans
ATTORNEY

Sept. 15, 1925.  
J. B. LOCKER  
BURGLARPROOF DEVICE  
Filed Dec. 6, 1924

J. B. Locker  
INVENTOR  
BY Victor J. Evans  
ATTORNEY

Sept. 15, 1925.
J. B. LOCKER
BURGLARPROOF DEVICE
Filed Dec. 6, 1924
1,554,107
5 Sheets-Sheet 5
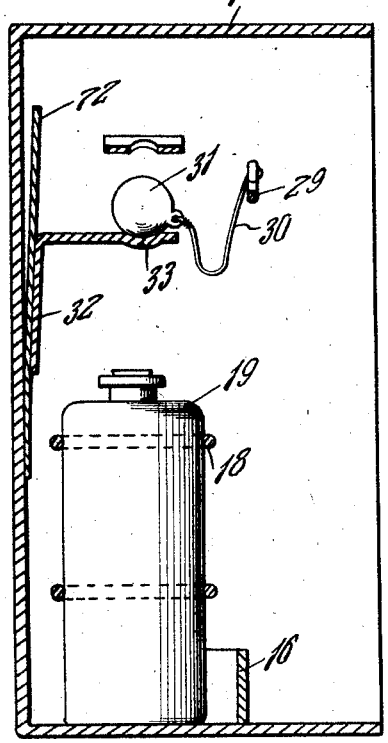
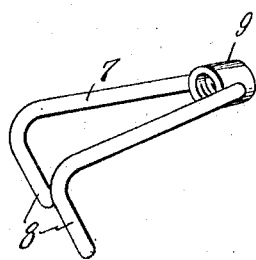
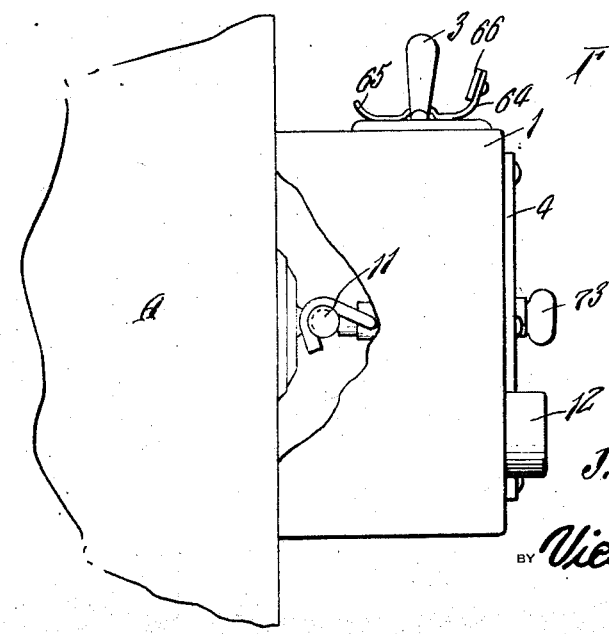
J.B. Locker
INVENTOR
BY Victor J. Evans
ATTORNEY Patented Sept. 15, 1925.

1,554,107

UNITED STATES PATENT OFFICE.

JOHN B. LOCKER, OF ST. LOUIS, MISSOURI.

BURGLARPROOF DEVICE.

Application filed December 6, 1924. Serial No. 754,450.

*To all whom it may concern:*

Be it known that I, JOHN B. LOCKER, a citizen of the United States, residing at St. Louis, State of Missouri, have invented new and useful Improvements in Burglarproof Devices, of which the following is a specification.

This invention relates to protective devices designed for use in connection with rooms, safes, boats, vehicles or the like and has for its object the provision of a novel protective device embodying a gas bomb and so constructed and arranged that the gas bomb will be set off or exploded in the event that the device is disturbed in any manner.

An important object is the provision of a device of this character which is so constructed and arranged that it may be attached to the handle, combination knob of a safe, the knob of a door or mounted upon or placed in proximity to any portion of a motor vehicle, boat or the like, and so constructed and arranged that in case of any tampering with the key the means for holding the device to the knob or handle, or the insertion of a drill or any device in the endeavor to tamper with will release the mechanism the parts will be released automatically so that the bomb will be set off or exploded and will liberate a large quantity of tear, or other gas which will permeate the immediate neighborhood of the device and consequently drive away and frustrate the efforts of any would-be thief.

Another object is the provision of a device of this character which embodies an electric device for the purpose of releasing the mechanism.

A further object is the provision of a device of this character which is provided with novel means whereby it may be quickly and easily secured upon the knob or handle of a safe door or the like in such manner that any attempt to effect subsequent removal by an unauthorized person will result in setting off the mechanism.

Yet another object is the provision of a device of this character which is provided with key-operated means whereby the parts may be held in neutral position and be prevented from actuation.

An additional object is the provision of a device of this character which will be comparatively simple and inexpensive to manufacture, easy to apply and use, positive in action, efficient and durable in service, and a general improvement in the art.

Figure 11:
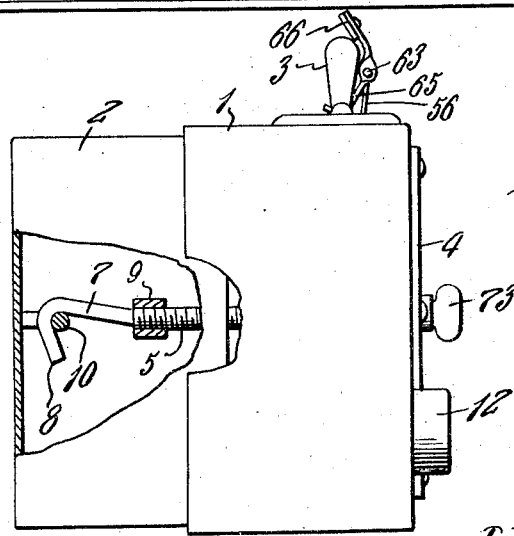
Figure 4:
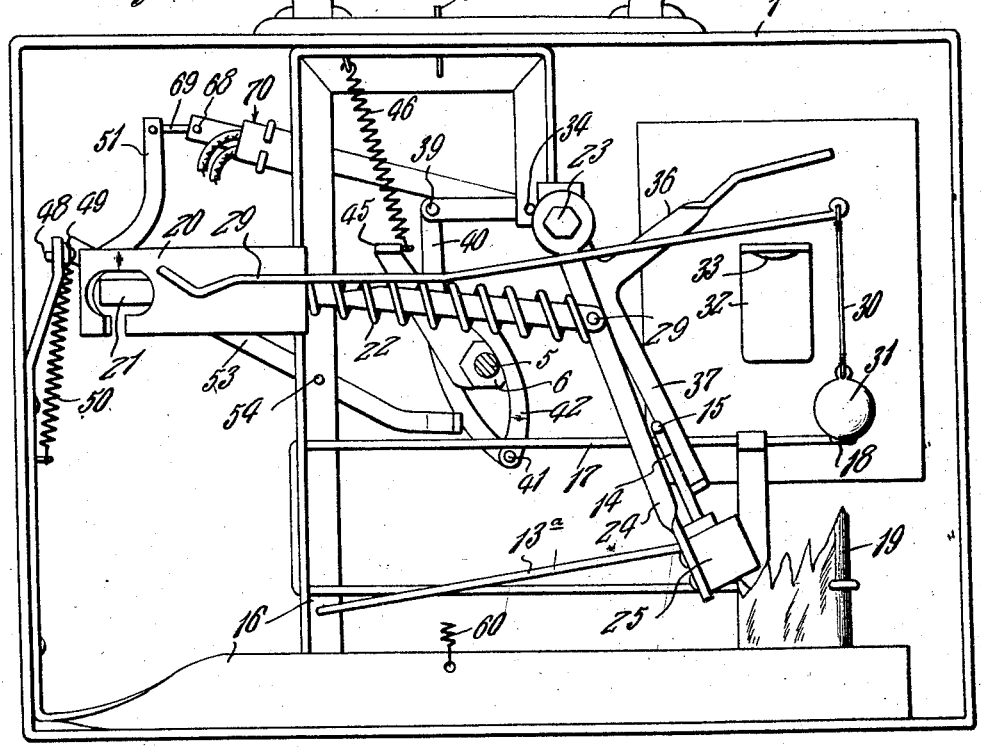
Figure 7:
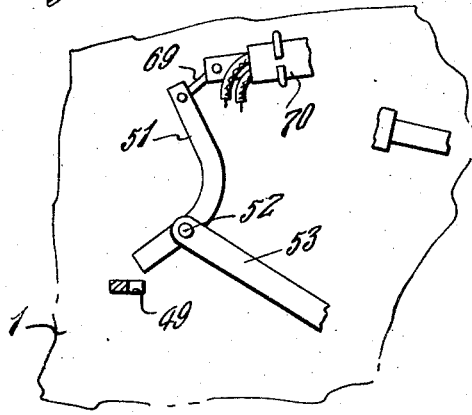
Figure 9:
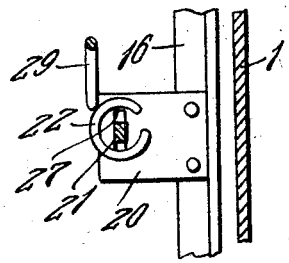

With the above and other objects and advantages in view, the invention consists in the details of construction to be hereinafter more fully described and claimed and illustrated in the accompanying drawings, in which:

Figure 1 is a perspective view of the complete device showing a box like arrangement thereof, Figure 2 is a view with a portion of the casing removed or a view looking at the inside of the main casing showing the parts in normal or set condition, Figure 3 is a similar view showing the device held in neutral or inoperative position by means of the key actuated mechanism, Figure 4 is a similar view but showing the mechanism released and the gas bomb bursted or exploded, Figure 5 is a detail view of that portion of the mechanism associated with the device provided for effecting mounting upon a door knob or handle, Figure 6 is a detail view of the electric device showing the same in one position, Figure 7 is a view showing the parts in a different position, Figure 8 is a detail view looking at one end of the casing from the inside thereof, the view being taken on the line 8—8 of Figure 3, Figure 9 is a detail section on the line 9—9 of Figure 3, Figure 10 is a section on the line 10—10 of Figure 2, Figure 11 is an end elevation partly in section showing the connecting means within the device, Figure 12 is a detail view of the device provided for engagement with a handle or knob, Figure 13 is an end elevation of the device, partly in section showing the clevis member engaged upon the knob handle of a safe or the like.

Referring more particularly to the drawings, the numerals 1 and 2 designate casing sections and the two are adapted to be connected in case the device is used as a carrying case or the section 1 may be used alone in case the device is mounted upon the door of a safe or the like. Of course these details will be explained hereinafter. This casing may be made of any desired size, shape and material though in the present practice it is preferable that it be constructed of sheet steel enameled or otherwise treated to have a pleasing appearance and to avoid corrosion. The section 2 telescopes within the section 1 and is adapted to be secured thereto by means to be described. The section 1 is equipped with a suitable handle 3 by means of which it may be carried about from place to place.

Secured upon the front or closed side of the section 1 is a plate 4 provided for armoring purposes and rotatably engaged through this plate and through the front of the casing section 1 is a screw 5 engaging through a nut 6 located against the inner side of the front wall of the section 1 as shown in certain of the views. In connection with this screw 5 I make use of a fork or clevis 7 which has its arms 8 of hook shape and extending from a hub or collar 9 which is screwed unto the screw 5. The arms 8 of this device 7 are adapted to be engaged with a staple like member 10 located within the section 2 for the purpose of holding the sections 1 and 2 together, or these arms may be engaged upon a knob or handle 11 on the door of a safe, vault or the like indicated at A. In case this clevis device is engaged upon the knob or handle of a safe or vault door it is obvious that the casing section 2 is omitted entirely whereas when the section 2 is used and the clevis device engaged with the member 10 therein it is obvious that the device constitutes a portable receptacle within which valuables may be carried.

On the front or closed side of the section 1 is a boss 12 within which is mounted a suitable lock mechanism, not shown, adapted to be released or locked by a suitable key and having associated therewith a rotatably mounted lug 13 carrying an arm 14 with a laterally extended end 15 for a purpose to be described.

Suitably mounted within the casing section 1 is a frame device designated broadly by the numeral 16, which frame device or structure includes any desired number of elements constructed in any specific detailed manner preferred and arranged to support the various parts of the mechanism to be described.

Suitably secured to a portion of the frame 16 is a holder including spaced arms 17 formed with curved or cradle portions 18 adapted to hold a bomb 19 of any desired or preferred type. In actual practice this bomb might consist merely of a bottle or other easily breakable receptacle containing gas forming material of any preferred or specific nature. It should be mentioned in passing, that I provide an elongated spring element 13ª associated with the lug 13 for the purpose of holding it at either desired limit of its movement depending upon the actuation of the locking mechanism.

Suitably mounted upon a portion of the frame 16 is a guide bracket 20 within which is slidably mounted a plunger 21 normally urged outwardly or away from the guide bracket 20 by means of a coil spring 22 or the like. Pivoted at 23 upon the frame 16 is an arm 24 carrying a hammer 25 adapted to be brought forcibly into engagement with the bomb 19 for the purpose of breaking the same. The outer end of the plunger 21 is pivotally connected with this arm 24 as shown at 26. In order that the plunger 21 and arm 24 may be held in retracted position against the resistance of the spring 22, I provide the plunger 21 with a retaining notch 27 within which may be engaged the angular end 28 of an elongated trigger arm 29 which extends to a position above the bomb 19 and which has its free end connected with a flexible element 30 from which is suspended a ball 31 or other suitable weight. Mounted in a manner to be described within the casing section 1 is a supporting bracket 32 for this ball, the bracket being preferably provided with a slight concavity 33 within which the ball will be normally maintained but from which it may roll in case of a slight jar imparted to the casing. When the device is in set condition with the trigger arm 29 elevated, the angular end 28 of this arm will engage within the notch 27 and hold the hammer in retracted position with the spring 22 under compression. Pivoted at 34 on the bracket 16 is an angular arm 35 having an extension 36 overlying the ball or weight 31 and adapted to engage the same and hold it upon the ledge or retaining seat 32 when the mechanism is in neutral position. The arm 35 is also provided with an extension 37 terminating in a lateral finger disposed in the path of movement of the end portion 15 of the lock or key operated arm 14.

Pivotally connected with one end of the angular bracket arm 35, as shown at 39, is a curved link 40 which is pivotally connected at 41 with a second curved link 42 which overlies the nut 6 to hold the latter against longitudinal movement with respect to the screw 5, and which is pivoted at 43 to an angular lever 44 which terminates at its upper end in a lateral extension 45 with which is connected a coil spring 46 secured to the frame 16 underneath the cover of the casing section 1. The angular lever 44 is provided with a finger 47 normally engaging and adapted to be moved in case of any attempted rotation of the nut 6 caused by turning the screw 5 in an unscrewing or counter clockwise direction.

Pivoted at 48 upon the frame 16 is an arm 49 urged downwardly by a coil spring 50 and having its free or upper end portion terminating in an upwardly extending curved arm 51. Pivoted at 52 upon this arm near its juncture with the lever 49 is an elongated lever 53 which extends downwardly in an inclined direction and which is pivoted at 54 upon the intermediate portion of the frame 16. This arm or lever 53 terminates at its free end in a lateral extension 55 for a purpose to be described.

Slidably mounted through the top of the casing 1 is a rod 56 which terminates in an eye 57 engaged upon a hook 58 at the upper end of a rod 59 at the lower end of which is connected a coil spring 60 anchored to the bottom portion of the frame 16. Connected at the juncture of the rod 59 with the spring 60 is a link 61 connected with the extension 55 of the arm or lever 53. Also connected with the link or formed thereon is a hook member 62 adapted to engage with the hammer arm 24 for holding the latter against movement. The rod 56 extends through and above the top of the casing section 1 and is pivotally connected at 63 with a lever 64 which has an end portion 65 adapted to rock upon the top of the casing section and which has another end portion provided with a laterally extending finger grip 66 adapted to be held against the handle 3 by a person carrying the device whereby the above described hook 62 engaging the hammer arm 24 will operate to hold the hammer in retracted position and consequently prevent breaking or explosion of the bomb.

Secured against the inner side of the front of the casing section 1 is an elongated metallic strip 67 provided at one end with a hole 68 within which is engaged a fuse wire 69 connected with the extremity of the curved arm 51 and normally acting to hold this arm in a certain position against the resistance of the spring 50. In case heat is applied to the box in the endeavor to destroy the same by means of a blow torch or the like it is obvious that the heat will be conducted by the strip 67 to the fuse wire 69 so that the latter will melt and allow the arm 51 to move whereupon the lever 53 will likewise move and release the hammer device.

In order that the device might be operated from a distance by means of some suitable electrical controlled system, I make use of a heating unit 70 including a resistance coil mounted upon the strip 67 and having connected therewith wires 71 which may be brought to any desired circuit closer whereby a current may be caused to flow through this resistance coil and heat the strip 67 sufficiently that the fuse 69 will be melted to release the mechanism.

In order that the device will not be susceptible to tampering in case a hole is drilled in the front of the section 1, I provide a loosely mounted plate 72 upon which the bracket device 32 is carried, this loosely mounted plate being so arranged that in case a hole is drilled in the casing section 1 and a wire or other implement inserted for the purpose of deranging the mechanism and rendering it inoperative this plate will tilt and cause the bracket likewise to tilt so that the ball will drop off and release the hammer device 37 so that the bomb will be set off.

In order to lock the mechanism against operation, it is merely necessary that the proper key be inserted within the lock mechanism contained within the boss 12 and the lug 13 turned so that the arm 14 thereof will be in such position that the lateral extension 15 thereon will be disposed in the path of travel of the arm 24 so that the latter cannot swing. The device may then be handled with perfect safety and be applied to whatever object is to be protected. When the key is subsequently turned to rotate the lug 13 in such position that the arm 14 will be out of obstructing relation to the hammer 25, it is obvious that the device will be set. At such a time, the lever 29 is in its uppermost position with the extension 28 thereon in engagement with the notch 27 so that the hammer 25 will be held in retracted position against the resistance of the spring 22. At this time, the ball or other weight 31 rests within the concavity 33 in the supporting bracket 32 and the arm 36 engages down upon the top of the weight for the purpose of holding it. This will of course be understood to be the condition when the parts are locked in neutral or in inoperative position. However, assuming that the key mechanism has been operated to swing the arm 14 out of obstructing relation to the hammer 25, it will be apparent that the angular member 35 moves at the same time so that the extension 36 thereon moves out of engagement with the ball or other weight 31. In case a jar is imparted to the device as for example in the endeavor to wrench it or lift it, the weight 31 will roll off from the ledge or shelf 32 and will drop down. When this occurs, the weight coming upon the end of the trigger arm or lever 29 will swing the same so that the extension 28 thereon will move out of the notch 27. When this occurs it is obvious that the spring 22 will force the plunger 21 violently out of the guide bracket 20 so that the arm 24 will be swung and the hammer 25 thereon will engage against the bomb or gas receptacle 19, smashing it so that the gas will be liberated.

As stated above, if a hole is drilled in the front of the casing section 1 and an implement inserted for the purpose of deranging the mechanism, the implement will engage against the loosely mounted plate 72 and cause it to engage one of the trigger elements or some portion of the mechanism which will effect release thereof so that the bomb will be exploded. It is likewise true, that if the device be attacked with a blow torch or if current be passed through the resistance coil from any suitable controlled device, the heat generated will melt the fuse wire 69 and permit the lever 49 to swing under the influence of the spring 50 so that in this instance the trigger mechanism will be released and the device set off.

In case an unauthorized person should grasp the head 73 of the screw 5 in an endeavor to effect rotation of the screw so as to disengage the clevis device 7 from the knob or handle from which it is engaged, there will be a tendency of the nut 6 to rotate and when this nut engages against the finger 47, it will turn the angle lever 44 on its pivot against the resistance of the spring 46 and consequently cause movement of the member 35 and other elements which will release the trigger mechanism and permit the bomb to be exploded.

From the foregoing description and a study of the drawings it will be apparent that I have thus provided a simply constructed device which is highly advantageous for use as a protection upon safes, vaults, room doors, within automobiles, launches, yachts or other objects or articles which it is desired to protect against theft. The device will operate in the case of any jar or shock being imparted thereto, in case an attempt is made to drill a hole therein and tamper with the mechanism, in case heat is applied for the purpose of melting the structure, and also in case a current is passed through the heating device from any suitable control mechanism. It is in this way it is obvious that the device is easily susceptible to being released and set off so that the bomb will be exploded and a large quantity of noxious gases released or liberated in the immediate vicinity of the box, which gases would naturally overcome the would-be robbers and frustrate their attempts.

While I have shown and described the preferred embodiment of the invention and have mentioned certain of the uses to which it may be put, it is obvious that many other uses may suggest themselves and it is likewise obvious that I reserve the right to make such changes in the form, construction and arrangement of parts as will not depart from the spirit of the invention or the scope of the subjoined claims.

Having thus described the invention, I claim:

1. In a device of the character described, a casing means within the casing for holding a breakable bomb member, a spring pressed hammer adapted to engage and break the bomb member, a trigger normally holding the hammer in retracted position, a weight connected with the trigger means normally sustaining the weight, and a holding member movable to engage the weight and hold the same against displacement.

2. In a device of the character described, a casing, means within the casing for holding a breakable bomb member, a spring pressed hammer adapted to engage and break the bomb member, a trigger normally holding the hammer in retracted position, a weight connected with the trigger means normally sustaining the weight, a holding member movable to engage the weight and hold the same against displacement, and a lock actuated mechanism including an arm adapted to be moved into the path of travel of the hammer for maintaining the same inactive and for maintaining said holding member in engagement with the weight.

3. In a device of the character described, a casing, means within the casing for holding a bomb, a spring pressed hammer device adapted to engage the bomb, a trigger mechanism normally holding said hammer in retracted position, and a fusible element holding the trigger in operative position.

4. In a device of the character described, a casing, means within the casing for holding a bomb, a spring hammer device adapted to engage and break the bomb, a trigger mechanism normally holding said hammer in retracted position, and a fusible element holding the trigger in operative position, and an electric heating unit adjacent the fuse member and adapted to apply heat thereto for fusing the same.

5. In a device of the character described, a casing equipped with a carrying handle, means within the casing for holding a bomb, a spring pressed hammer within the casing adapted to engage the bomb, a grip element movably mounted exteriorly of the casing adjacent the handle, a spring pressed member connected with said grip element, and a hook carried by said spring pressed member and engageable with the hammer for holding the same retracted.

6. In a device of the character described, a casing, a screw member rotatably mounted through the casing, a clevis device mounted upon said screw member and adapted for engagement upon a handle element, means within the casing for holding a bomb, a spring pressed hammer mounted within the casing and adapted to engage and break the bomb, a trigger mechanism connected with the hammer for normally holding the same retracted, a nut member screwed upon said screw member within the casing, and means engaging said nut member and movable upon attempted rotation thereof for releasing the trigger mechanism.

7. In a device of the character described, the combination of a casing, means within the casing for holding an explosive bomb, a spring pressed hammer movably mounted within the casing and adapted to engage the bomb, a weight operated trigger mechanism connected with the hammer for holding the same retracted, means normally supporting the weighted trigger, a lever device connected with the trigger, a fusible element connected with the lever device, means for securing the casing to a handle element on a device to be protected, said means including a rotary element and a relative stationary element, and a mechanism mounted within the casing and movable upon movement of said relatively stationary element whereby to release the hammer.

In testimony whereof I affix my signature.

JOHN B. LOCKER.